United States Patent [19]

Okazaki

[11] Patent Number: 5,190,259
[45] Date of Patent: Mar. 2, 1993

[54] CUP HOLDING APPARATUS

[75] Inventor: Hidetsugu Okazaki, Utsunomiya, Japan

[73] Assignee: Honda Giken Kogyo Kabushiki Kaisha, Tokyo, Japan

[21] Appl. No.: 829,301

[22] Filed: Feb. 3, 1992

[30] Foreign Application Priority Data

Mar. 1, 1991 [JP] Japan .................. 3-010616[U]

[51] Int. Cl.$^5$ .................................................. B60R 7/00
[52] U.S. Cl. ............................ 248/311.2; 297/194; 224/42.42
[58] Field of Search ............... 248/311.2, 309.1, 316.4; 297/194, 188; 220/737; 224/42.42, 42.45 R, 274

[56] References Cited

U.S. PATENT DOCUMENTS

| 4,848,627 | 7/1989 | Maeda et al. ............ 224/42.42 X |
| 4,928,865 | 5/1990 | Lorence et al. .......... 224/42.42 X |
| 4,981,277 | 1/1991 | Elwell ........................ 248/311.2 |
| 5,007,610 | 4/1991 | Christiansen et al. .... 248/311.2 |
| 5,024,411 | 6/1991 | Elwell ........................ 248/311.2 |
| 5,096,152 | 3/1992 | Christiansen et al. ..... 297/194 X |

FOREIGN PATENT DOCUMENTS

| 3700614 | 7/1988 | Fed. Rep. of Germany ... 224/42.42 |
| 0164821 | 10/1982 | Japan ............................. 224/42.42 |
| 0170646 | 10/1983 | Japan ............................. 224/42.42 |
| 62-179850 | 11/1987 | Japan . |

Primary Examiner—Karen J. Chotkowski
Attorney, Agent, or Firm—Armstrong, Westerman, Hattori, McLeland & Naughton

[57] ABSTRACT

A cup holding apparatus has a cup holder for holding a cup, a containing portion for containing therein the cup holder, and a hinged lid provided on a base portion which constitutes the containing portion such that the cup holder can be held between the lid and the base portion when the lid is closed. A first link is rotatably connected at one end thereof to the base portion and is rotatably connected at the other end thereof to a first pivot portion which is provided on the cup holder. A second link is rotatably connected at one end thereof to the lid and is rotatably connected at the other end thereof to a second pivot portion which is provided on the cup holder away from the first pivot portion. A link mechanism which has the cup holder as an intermediate link is thus constituted to take the cup holder into or out of the containing portion by the closing or opening operation of the lid.

4 Claims, 3 Drawing Sheets

CUP HOLDING APPARATUS

BACKGROUND OF THE INVENTION

This invention relates to a cup holding apparatus which is provided mainly inside a motorcar room.

In the Japanese Published Unexamined Utility Model Registration Application No. 179850/1987, there is disclosed a cup holding apparatus in which a base portion, which constitutes a containing portion for containing therein a cup holder for holding a cup, is concavely provided in an instrument panel or a console box inside a motorcar room, and a hinged lid is attached to the base portion such that, at the time of closing the lid, the cup holder can be contained in such a manner as to be held between the lid and the base portion. This apparatus is arranged as follows. Namely, a pair of first links are rotatably connected at respective one end to the base portion. A pair of second links are rotatably connected at respective one end to the lid. The other ends of the first pair of links are rotatably connected to the other ends of the second pair of links, respectively. A cup holder is rotatably supported by one pair out of the two pairs of links so that it can be inclined about a horizontal axis. When the first and the second links are extended obliquely at the time of opening the lid, the cup holder is pulled or taken out of the containing portion.

The reason why the cup holder is rotatably supported by one pair out of the two pairs of links is to make sure that the cup holder can be inclined into a posture along the base portion when the two pairs of links are folded down. As a consequence, in the above-described apparatus, when the cup holder is pulled out by the opening operation of the lid, the holder must be manually changed in its posture to a horizontal one, resulting in a troublesome operation. It has another disadvantage in that the cup holder is unstable, even after making it horizontal, resulting in lack of stability.

OBJECT AND SUMMARY OF THE INVENTION

Taking the above-described disadvantages into consideration, this invention has an object of providing a cup holding apparatus in which the cup holder can be pulled or taken out in a predetermined posture at the time of opening the lid and in which the cup holder can be stably supported in that posture.

In order to attain the above-described object, this invention is a cup holding apparatus having a cup holder for holding a cup, a containing portion for containing therein the cup holder, and a hinged lid provided on a base portion which constitutes the containing portion such that the cup holder can be contained in such a manner as to be held between the lid and the base portion when the lid is closed, wherein the apparatus is provided with a first link which is rotatably connected at one end thereof to the base portion and is rotatably connected at the other end thereof to a first pivot portion provided on the cup holder, and a second link which is rotatably connected at one end thereof to the lid and is rotatably connected at the other end thereof to a second pivot portion provided on the cup holder away from the first pivot portion, such that a link mechanism having the cup holder as an intermediate link is constituted to take the cup holder into or out of the containing portion by the closing or opening operation of the lid.

Since the cup holder is supported by the links on the base portion side and on the lid side at the pivot portions which are away from each other, the posture of the cup holder is determined by the opening degree of the lid. At the time of opening the lid, the cup holder is pulled out of the containing portion in a desired posture and is maintained in that posture. Accordingly, it is not necessary to correct the posture of the cup holder after it has been pulled out. This results in an improved operability as well as an improved stability of the cup holder.

In this case, if a holding arm for holding the cup is provided in the cup holder in a foldable manner and an arm driving mechanism which folds the holding arm at the time of closing the lid is provided such that the swinging movement of at least one of the two links relative to the cup holder can be used as its driving force, the holding arm can be automatically folded at the time of closing the lid. This can contribute to a smaller containing space and a smaller cup holding apparatus.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

One embodying example of this invention will now be explained with reference to the accompanying drawings.

Figure 1:
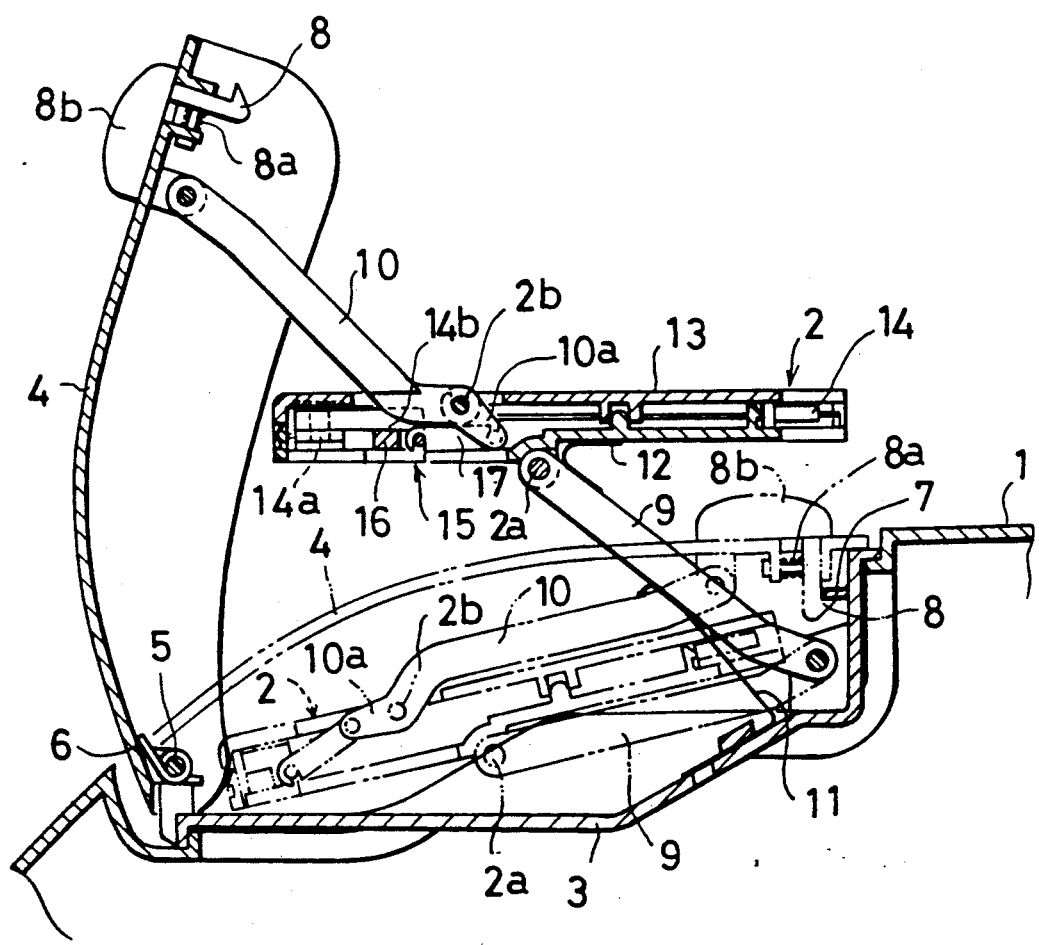
FIG. 1 is a vertical sectional view of one example of this invention apparatus.
Figure 2:
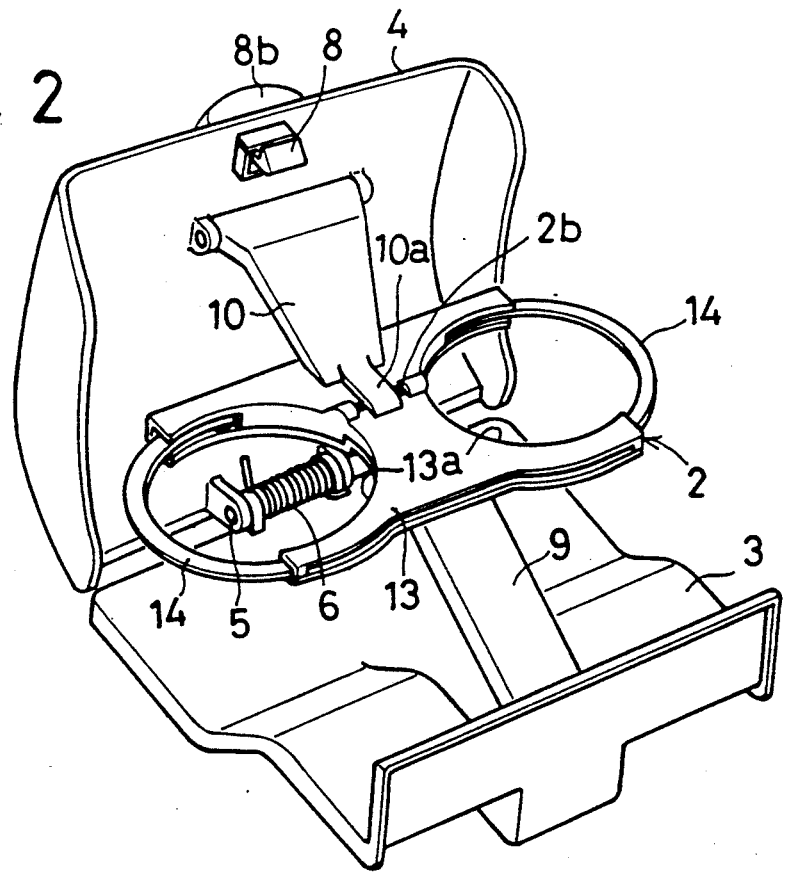
FIG. 2 is a perspective view thereof.

Referring to FIGS. 1 and 2, numeral 1 denotes a console box in a motorcar room and numeral 2 denotes a cup holder which is capable of holding two pieces of cups. In the console box 1 there is concavely provided a base portion 3 which constitutes a containing portion of the cup holder 2. The base portion 3 is provided with a lid 4 which covers the base portion 3 from above such that the lid 4 can be opened and closed about a hinge portion 5 provided at a front end of the lid 4 and can also be urged towards opening direction by a spring 6 which is mounted on the hinge portion 5. Further, at a rear lower end of the lid 4 there is provided a claw member 8 which is urged backwards by a spring 8a and is engaged with a jaw portion 7 which is formed in a rear wall of the base portion 3 so that the lid 4 can be locked in a closed condition through the engagement of the claw member 8 with the jaw portion 7. The claw member 8 is provided with an operating knob 8b which is exposed above the lid 4. When the claw member 8 is pushed forwards by the operating knob 8b against the spring 8a to bring the claw member 8 out of engagement with the jaw portion 7, the lid 4 is caused to be opened by the urging force of the spring 6.

The cup holder 2 is rotatably supported at a first pivot portion 2a provided at a lower central portion of the cup holder 2 by means of a first link 9 whose one end is rotatably connected to a rear of the base portion 3 and the other end is connected to the first pivot portion 2a. The cup holder 2 is also rotatably supported at a second pivot portion 2b provided at an upper forward portion of the cup holder 2 by means of a second link 10 whose one end is rotatably connected to a rear of the lid 4 and the other end is connected to the second pivot portion 2b. A link mechanism is thus constituted by connecting the first and the second links 9, 10 with the cup holder 2 working as an intermediate link. When the lid 4 is opened, the first and the second links 9, 10 are obliquely extended via the cup holder 2 between the lid 4 and the base portion 3 so that the cup holder 2 can be pulled or taken out above the containing portion in a horizontal posture. When the lid 4 is closed, the first link 9, the cup holder 2 and the second link 10 are folded in a vertically overlapping manner such that the cup holder 2 is contained in the containing portion sandwiched between the base portion 3 and the lid 4. The first link 9 is urged by a spring 11 relative to the base portion 3 towards an erecting or an upright direction (clockwise in FIG. 1). Further, a spring 12 is provided to urge the cup holder 2 counterclockwise relative to the first link 9 so that, when the lid 4 is closed from its open position, the cup holder 2 is first inclined about the first pivot portion 2a in a front-down direction (counterclockwise in FIG. 1), and then the second link 10 is swung in a required folding direction (clockwise in FIG. 1) relative to the lid 4.

Figure 4:
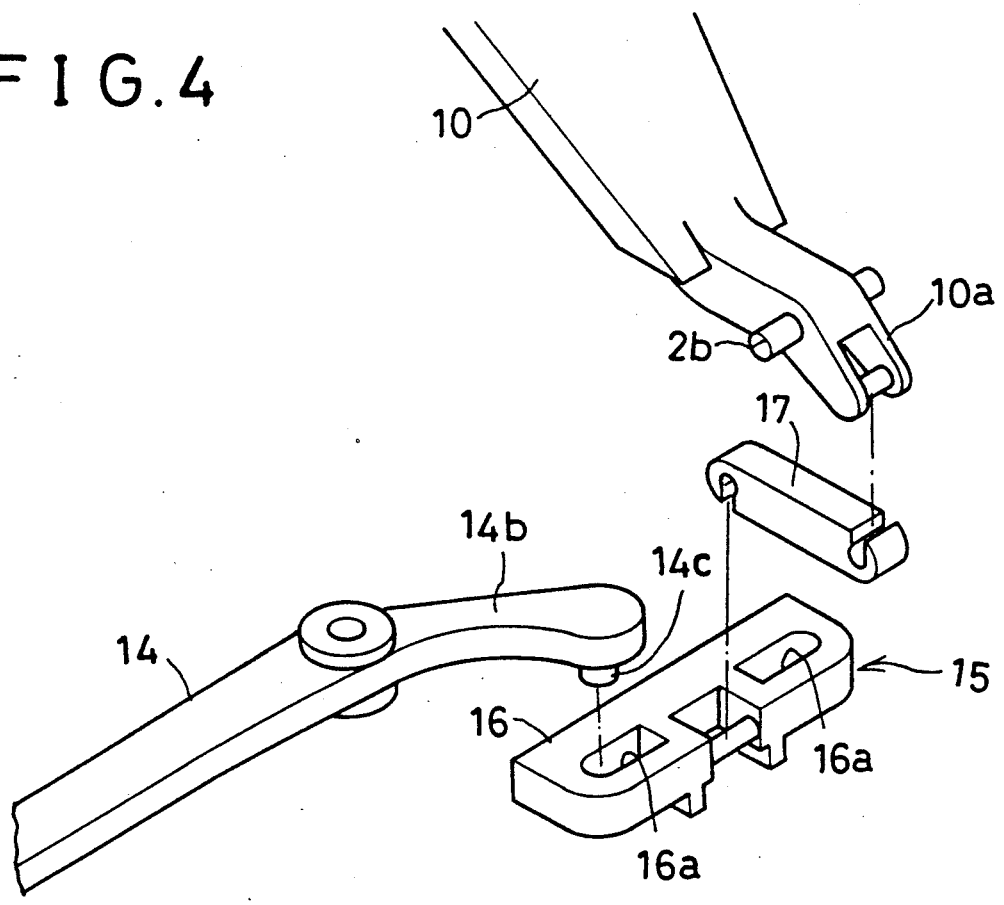
FIG. 4 is an exploded perspective view of an arm driving mechanism.
Figure 3:
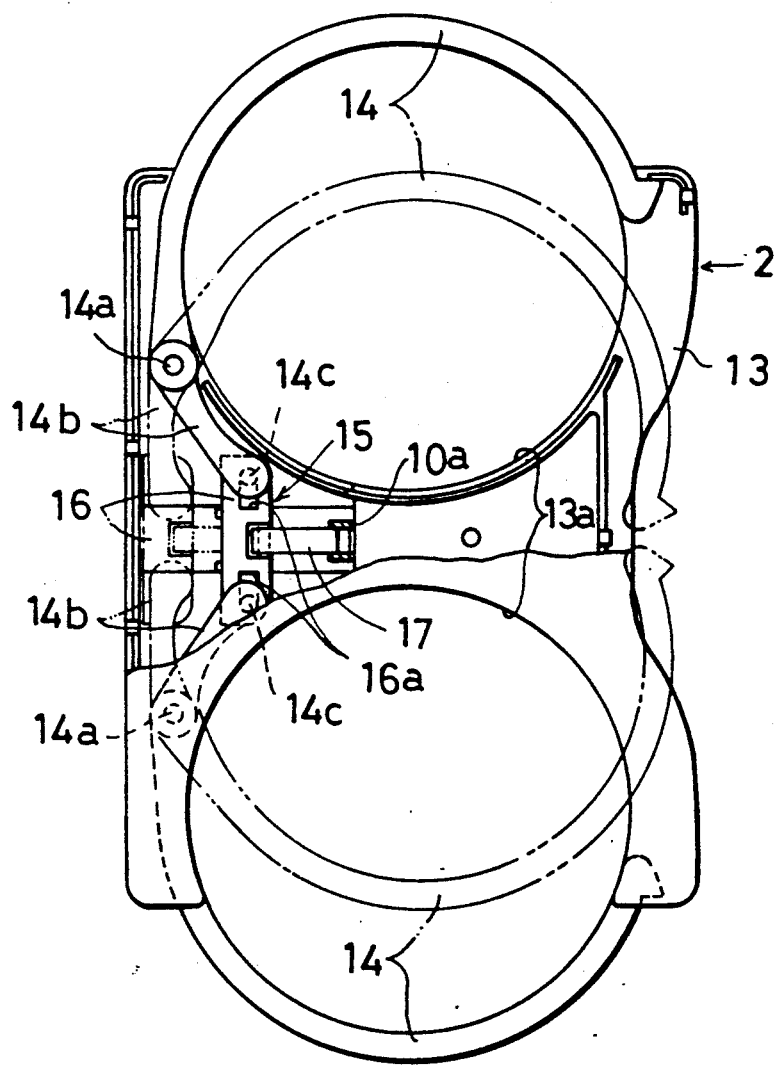
FIG. 3 is a plan view of a cup holder with a part thereof cut away.

As shown in FIG. 3, the cup holder 2 comprises a main body 13 which has formed therein a semicircular concave portion 13a on each lateral side thereof and has the above-described pivot portions 2a, 2b, as well as a pair of arcuate holding arms 14 which laterally hold an unillustrated cup inserted into each concave portion 13a. The main body 13 is made up of a hollow construction consisting of two pieces of upper and lower plates. One end of each holding arm 14 is inserted into respective front end portion of the main body 13 and is rotatably mounted thereon. Each holding arm 14 is arranged to be foldable inwards about the rotatable mounting portion 14a. Both holding arms 14 are arranged to be foldable, at the time of closing the lid, via an arm driving mechanism 15 which is interlocked with the second link 10. In more detail, as shown in FIG. 4, the arm driving mechanism 15 is made up of a sliding member 16 which has a slot 16a on each lateral side thereof for engaging via a pin 14c with a lever portion 14b extending on one end of each holding arm 14. The sliding member 16 is contained inside the main body 13 so as to be movable back and forth. Another member to make up the arm driving mechanism 15 is a link 17 one end of which is rotatably connected to the sliding member 16 and the other end of which is rotatably connected to a lever portion 10a which extends from that end of the second link 10 which is on the side of the second pivot portion 2b. It is so arranged that, when the lid 4 is closed, the sliding member 16 advances as shown by an imaginary line in FIG. 3 via the lever portion 10a and the link 17 through the clockwise swinging of the second link 10 relative to the cup holder 2, whereby the holding arms 14 are folded inwards.

Although not illustrated, the following arrangement is also possible. Namely, by means of an arcuate pinion provided at the end of the second link 10 and a rack on the sliding member 16 which engages with the pinion, a rack-and-pinion type of arm driving mechanism may be constituted. Further, the arm driving mechanism may be arranged to operate in interlocking with the first link 9. Anyway, what is necessary is an arrangement in which the holding arms 14 are folded by utilizing, as its driving force, the swinging movement of at least one of the first and the second links 9, 10 relative to the cup holder 2.

In addition, in order to increase the stability of the cup holder 2, an arrangement may be employed in which there is provided between the cup holder 2 and the base portion 3 an auxiliary link, though not illustrated, which is attached to the first link 9 in a crossing and rotatable manner with both ends of the auxiliary link being slidably engaged with the cup holder 2 and the base portion 3, respectively, thereby forming an X-link by the first link 9 and the auxiliary link.

It is readily apparent that the above cup holding apparatus has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A cup holding apparatus having a cup holder for holding a cup, a containing portion for containing therein said cup holder, and a hinged lid provided on a base portion which constitutes said containing portion such that said cup holder can be contained in such a manner as to be held between said lid and said base portion when said lid is closed, wherein said apparatus is provided with
   a first link which is rotatably connected at one end thereof to said base portion and is rotatably connected at the other end thereof to a first pivot portion provided on said cup holder, and
   a second link which is rotatably connected at one end thereof to said lid and is rotatably connected at the other end thereof to a second pivot portion provided on said cup holder away from said first pivot portion,
   such that a link mechanism having said cup holder as an intermediate link is constituted to take said cup holder into or out of said containing portion by the closing or opening operation of said lid.

2. A cup holding apparatus according to claim 1, wherein a holding arm for holding the cup is provided in said cup holder in a foldable manner and an arm driving mechanism for folding said holding arm at the time of closing said lid is provided such that the swinging movement of at least one of said two links relative to said cup holder is used as its driving force.

3. A cup holding apparatus according to claim 2, wherein said arm driving mechanism is constituted by a lever portion which extends from said holding arm at one end that is rotatably connected to said cup holder, a sliding member which is connected to said lever portion and slides on said cup holder, and an interlocking member for mechanically interlocking said one of said links and said sliding member.

4. A cup holding apparatus according to any one of claims 1-3, wherein said lid is rotatably connected to a front end of said base portion, said first link is rotatably connected to a rear end of said base portion, said second pivot portion is positioned ahead of said first pivot portion, and there are provided a first spring which urges said first link towards an upright direction relative to said base portion and a second spring which urges said cup holder in a front-down direction relative to said first link.

* * * * *